United States Patent
Rudd et al.

(10) Patent No.: US 7,613,746 B2
(45) Date of Patent: Nov. 3, 2009

(54) SYSTEM AND METHOD FOR FILE SIZE MANAGEMENT

(75) Inventors: Michael L Rudd, Fort Collins, CO (US); Jerlyn R Culp, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1895 days.

(21) Appl. No.: 09/952,997

(22) Filed: Sep. 14, 2001

(65) Prior Publication Data

US 2003/0055844 A1 Mar. 20, 2003

(51) Int. Cl.
*G06F 17/30* (2006.01)
(52) U.S. Cl. .................... 707/204; 386/70; 386/95
(58) Field of Classification Search ............... 707/200, 707/202, 204; 709/228; 714/6; 725/87, 725/112; 386/70, 95
See application file for complete search history.

(56) References Cited

FOREIGN PATENT DOCUMENTS

| JP | 10283288 A | | 10/1998 |
|---|---|---|---|
| JP | 10283288 A | * | 10/1998 |
| JP | 11102332 A | | 4/1999 |
| JP | 11102332 A | * | 4/1999 |
| JP | 2000236542 | | 8/2000 |

* cited by examiner

*Primary Examiner*—Shahid A Alam

(57) ABSTRACT

The present disclosure relates to a system and method for managing the size of software files that are to be transmitted. In one arrangement, the system and method pertain to referring to a default transmission setting to determine whether a media file to be created will be too large and adjusting media capture device settings to reduce the size of the media file that will be created where the file exceeds the predetermined size. In another arrangement, the system and method pertain to referring to a default transmission setting to determine whether the stored media file is too large and reducing the size of the stored media file where the file exceeds the predetermined size.

13 Claims, 6 Drawing Sheets

SYSTEM AND METHOD FOR FILE SIZE MANAGEMENT

FIELD OF THE INVENTION

The present disclosure relates to software file management. More particularly, the disclosure relates to a system and method for file size management.

BACKGROUND OF THE INVENTION

Modern media capture devices such as scanners, digital cameras, and digital video recorders are capable of capturing very large amounts of data. Although local storage of relatively large files is typically not a problem for most users due to the wide availability of inexpensive memory, large file sizes can cause problems where the user desires to transmit the files over a network (e.g., Internet) to a destination device such as a personal computer (PC) of an email recipient or a network server that is maintained by a repository provider. In particular, large files may take a long time to reach the destination device, particularly where the sender and/or recipient connection to the network is not a high-speed connection.

Although users often opt to collect the maximum amount of data, there are limits as to the utility of capturing this much data. For instance, many scanners and/or digital cameras are available in the market that are capable of resolutions several times the maximum that can be detected by the observer. Users are often unaware, however, that they could obtain substantially the same result with less data and, therefore, smaller media files. Even where the reduction of file size would result in a noticeably lower quality result, there are situations in which high transmission speed may be more important to the user than high quality.

Unfortunately, media capture device users often do not appreciate the effect file size has on transmission. Therefore, such users often transmit unnecessarily large files without considering the negative effect the file size will have on the transmission. Even where the user does appreciate that file size affects transmission, many such users do not know how to properly modify the data so as to obtain a more reasonably-sized file. Therefore, the user may recognize the problem although may not know how to remedy it. Although most of these difficulties can be remedied by the user creating relatively small media files, this solution is unsatisfactory in that the user may not choose to transmit many of the files (e.g., captured images) and therefore could unduly limit quality (e.g., image quality) where it is not necessary to do so.

SUMMARY OF THE INVENTION

From the foregoing, it can be appreciated that it would be desirable to have a system and method with which a user can be alerted as to an overly large file size and, if the user wishes, obtain help in reducing the size of the file.

The present disclosure provides such a system and method. In one arrangement, the method comprises the steps of referring to a default transmission setting to determine whether a file to be created will exceed a predetermined size and adjusting media capture device settings to reduce the size of the media file that will be created where the file would exceed the predetermined size.

In another arrangement, the method comprises the steps of referring to a default transmission setting to determine whether a stored file exceeds a predetermined size and reducing the size of the stored media file where the file exceeds the predetermined size.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
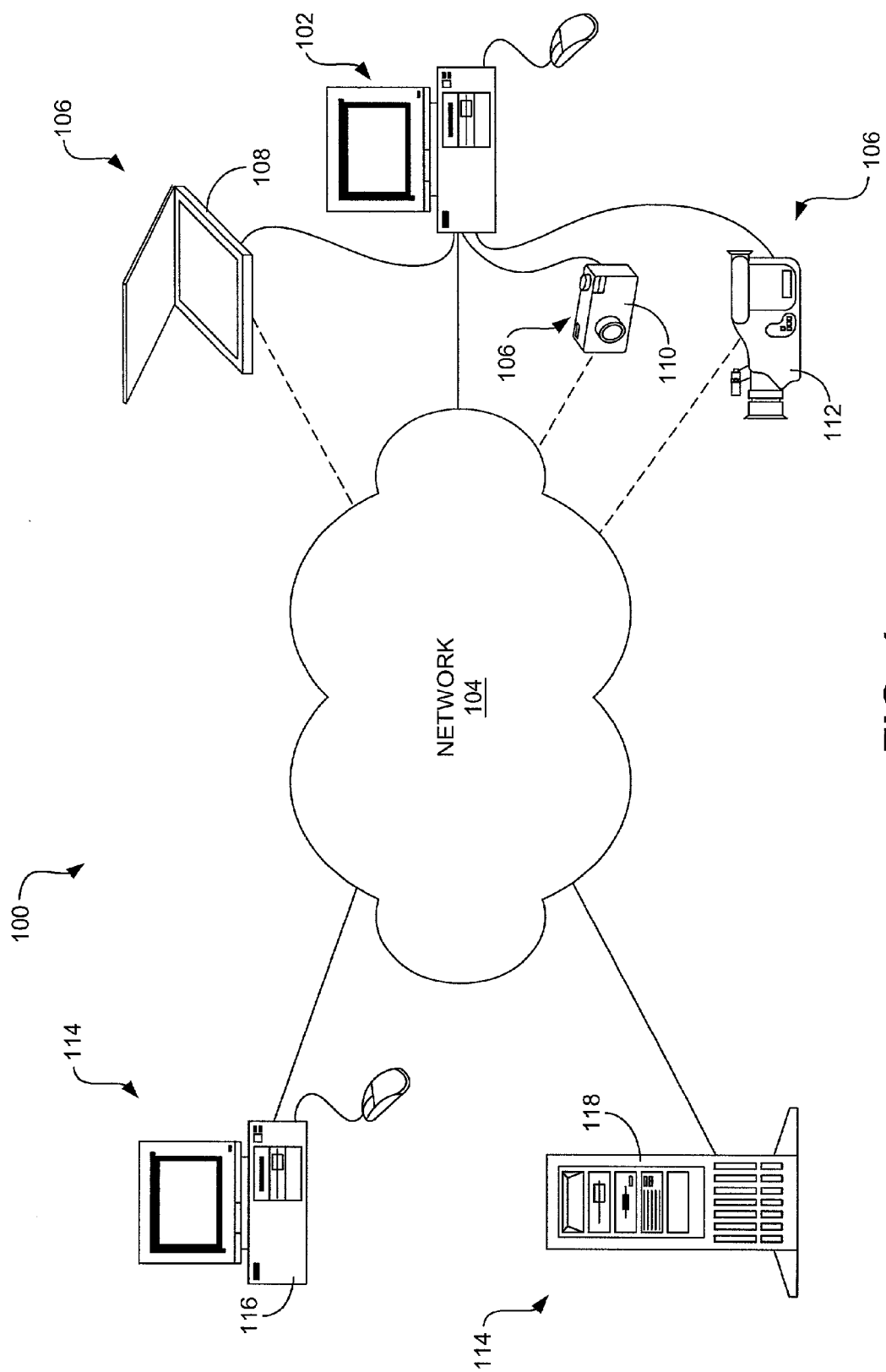
FIG. 1 is a schematic view of an embodiment of a system for file size management according to the present invention.

Referring now in more detail to the drawings, in which like numerals indicate corresponding parts throughout the several views, FIG. 1 illustrates an embodiment of a system 100 for file size management according to the present invention. As indicated in this figure, the system 100 can comprise a user computing device 102 that is connected to a network 104. As suggested by FIG. 1, the user computing device 102 can comprise a personal computer (PC). However, it is to be understood that the computing device 102 can take many different forms. Therefore, the computing device 102 can, alternatively, comprise a handheld computing device such as a personal digital assistant (PDA) or substantially any other computing device that can be connected to a network and/or used with media capture devices.

The network 104 can comprise one or more sub-networks that are communicatively coupled to each other. By way of example, these networks can include one or more local area networks (LANs) and/or wide area networks (WANs). Typically, however, the network 104 comprises a set of networks that forms part of the Internet. Further included in the system 100 are media capture devices 106 that, as indicated in FIG. 1, can comprise a scanner 108, a still digital camera 110, and a digital video recorder 112. Although these particular media capture devices are illustrated in FIG. 1 and specifically identified herein, persons having ordinary skill in the art will appreciate that the teachings contained within this disclosure pertain to substantially any device that is capable of capturing audio and/or image (still or video) data. As indicated in FIG. 1, each of the media capture devices 106 can be connected to the user computing device 102. In addition or in exception, the media capture devices 106 can be directly connected to the network 104 (as indicated with dashed lines) such that data can be transmitted across the network to another device connected to the network.

Also shown in FIG. 1 are destination devices 114 that, as depicted in the figure, can comprise a recipient computing device 116 and a network server 118. Although these particular devices are illustrated, it is to be appreciated that they are provided as examples only and are not intended to limit the scope of the present disclosure. Each of the destination devices 114 is connected to the network 104 in some manner. As is described in greater detail below, the management of file sizes may be, at least partly, dependent upon the nature of a destination device 114 and/or the nature of its connection to the network 104.

Figure 2:
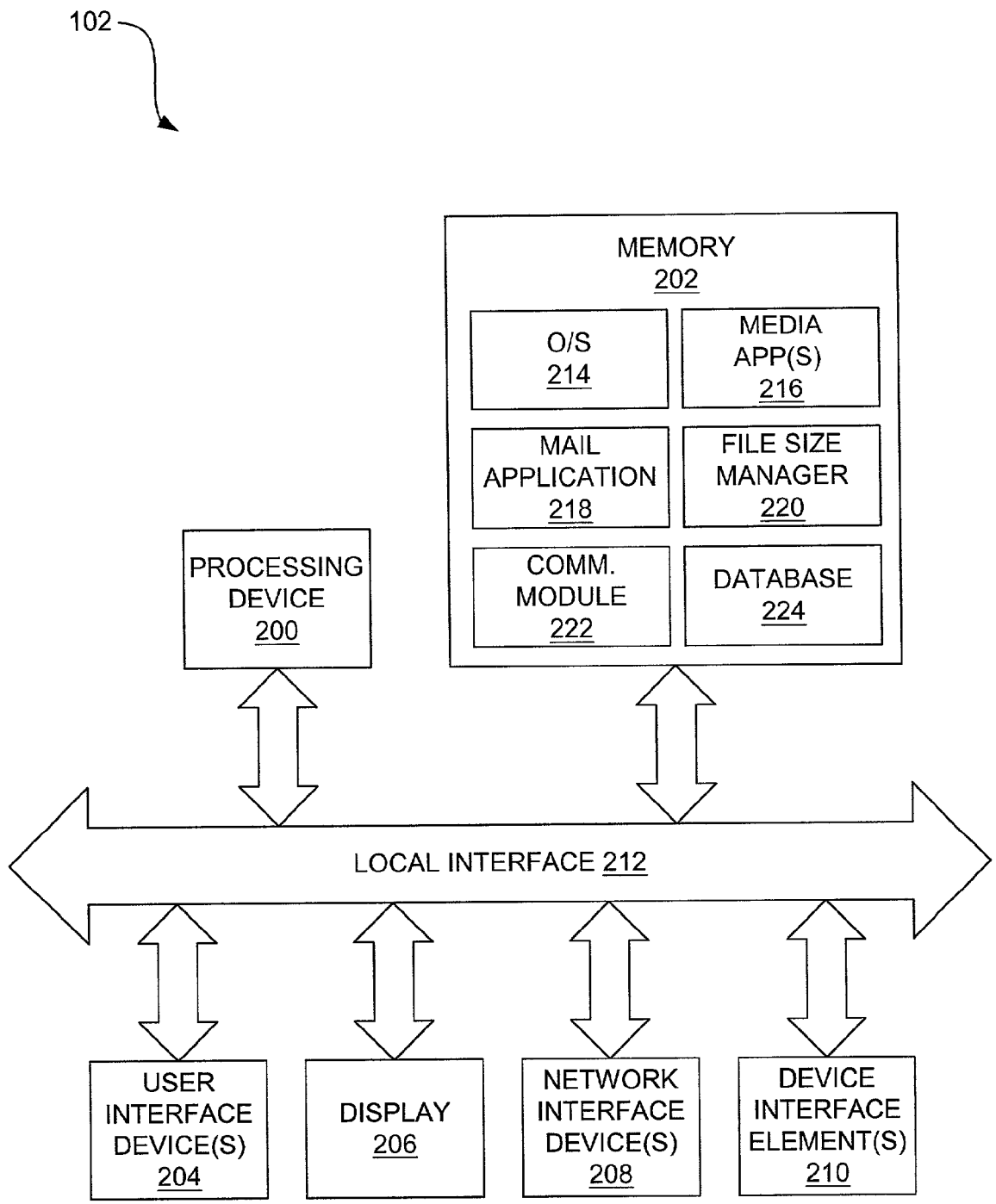
FIG. 2 is a schematic view of a user computing device shown in FIG. 1.

FIG. 2 is a schematic view illustrating an example architecture for the user computing device 102 shown in FIG. 1. As indicated in FIG. 2, the computing device 102 can comprise a processing device 200, memory 202, one or more user interface devices 204, a display 206, one or more network interface devices 208, one or more device interface elements 210, and a local interface 212 to which each of the other components electrically connects. The local interface 212 may have additional elements, which are omitted for simplicity, such as controllers, buffers (caches), drivers, repeaters, and receivers to enable communications. Furthermore, the local interface 212 may include address, control, and/or data connections to enable appropriate communications among the aforementioned components.

The processing device 200 can include any custom made or commercially available processor, a central processing unit (CPU) or an auxiliary processor among several processors associated with the computing device 102, a semiconductor based microprocessor (in the form of a microchip), or a macroprocessor. The memory 202 can include, without limitation, any one of a combination of volatile memory elements (e.g., random access memory (RAM, such as DRAM, SRAM, etc.)) and nonvolatile memory elements (e.g., ROM, hard drive, tape, CDROM, etc.).

The user interface devices 204 typically comprise those normally used in conjunction with a computing device. For instance, the user interface devices 204 can comprise a keyboard, mouse, etc. As shown in FIG. 1, the display 206 typically comprises a monitor. The one or more network interface devices 208 comprise the hardware with which the computing device 102 transmits and receives information over the network 104. By way of example, the network interface devices 208 include components that communicate both inputs and outputs, for instance, a modulator/demodulator (e.g., modem), a radio frequency (RF) or other transceiver, a telephonic interface, a bridge, a router, etc. The one or more device interface elements 210 comprise the various hardware, e.g. external buses and/or communication ports, that are used to electrically connect the computing device 102 with other local devices.

The memory 202 comprises various software programs including an operating system 214, one or more media applications 216, a mail application 218, a file size manager 220, and a communications module 222. The operating system 214 controls the execution of other software, such as the file size manager 220, and provides scheduling, input-output control, file and data management, memory management, and communication control and related services. The media applications 216 can comprise one or more programs that facilitate media capture and/or that can be used to modify or otherwise manipulate media data. By way of example, the media applications 216 can comprise a scanning program adapted for use with a scanner and one or more media management applications with which captured media can be stored within a database 224 of the memory 202 and/or manipulated others in ways.

The mail application 218 preferably comprises a program that facilitates the creation, transmission, and receipt of email messages which may, for example, include media data. The file size manager 220 is configured to, based upon predetermined default transmission settings, alert the user that a file that is about to be created and/or transmitted is inappropriate (typically too large). In addition, the file size manager 220 is configured to, under the control of the user, change device settings and/or adjust (typically reduce) file size to obtain a more appropriate file for the intended transmission. The operation of the file size manager 220 is described in detail below in relation to FIGS. 4-6. Finally, the communications module 222 is preferably configured to, in conjunction with the network interface devices 208, send and receive data, including media data, via the network 104.

Figure 3:
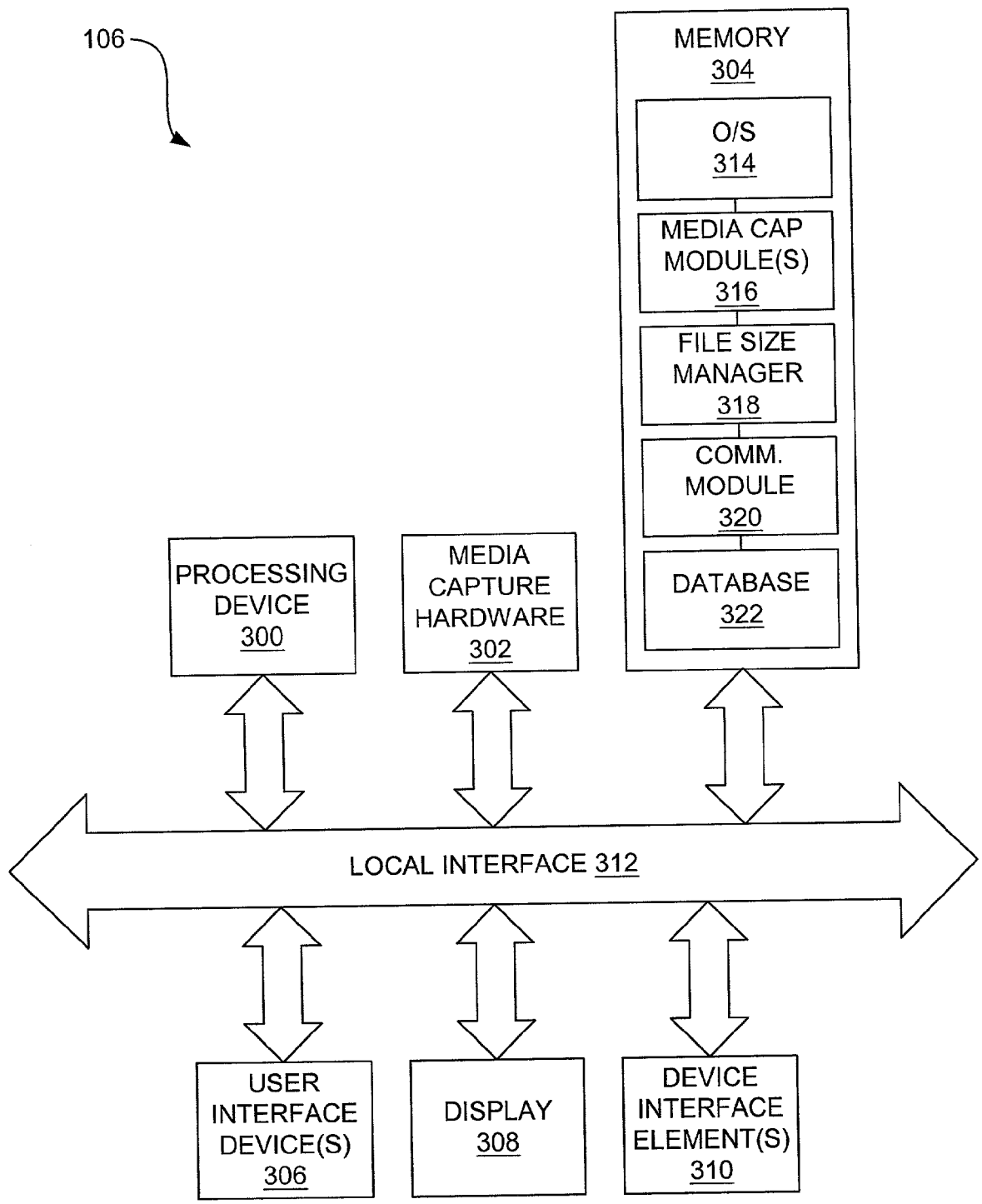
FIG. 3 is a schematic view of a media capture device shown in FIG. 1.

FIG. 3 is a schematic view illustrating an example architecture for the media capture devices 106 shown in FIG. 1. As indicated in FIG. 3, each media capture device 106 generally comprises a processing device 300, media capture hardware 302, memory 304, one or more user interface devices 306, a display 308, and one or more device interface elements 310. Each of these components is connected to a local interface 312 that, by way of example, comprises one or more internal buses. The processing device 300 is adapted to execute commands stored in memory 304 and can comprise a general-purpose processor, a microprocessor, one or more application-specific integrated circuits (ASICs), a plurality of suitably configured digital logic gates, and other well-known electrical configurations comprised of discrete elements both individually and in various combinations to coordinate the overall operation of the media capture device 106.

The media capture hardware 302 comprises the various components used to retrieve and store digital audio and/or images (still or video). Where the media capture device 106 comprises a scanner (e.g., scanner 108), the media capture hardware 302 can generally comprise a platen, optical sensor, focusing mechanism, etc. Alternatively, where the media capture device 106 comprises a digital camera (e.g., camera 110) or digital video recorder (e.g., recorder 112) the media capture hardware 302 can comprise a lens, one or more focusing elements (lenses, mirrors, etc.), one or more light sources, one or more light sensing elements (e.g., charge-coupled device (CCD)), and, optionally, a microphone.

The user interface devices 306 typically comprise interface tools with which the device settings can be changed and through which the user can communicate commands to the media capture device 106. By way of example, the user interface devices 306 can comprise one or more function keys with which the operation of the media capture device 106 can be controlled. The display 308 is adapted to communicate graphical information to the user, such as device settings, and can comprise a liquid crystal display (LCD) or other type of display screen. The device interface elements 310 are adapted to facilitate electrical connection with another device such as the user computing device 102 and, if the media capture device 106 is network-enabled, to facilitate connection to the network 104. In either case, the interface elements 310 normally comprise a data transmitting/receiving device and/or one or more communication ports.

The memory 304 includes various software and/or firmware programs including an operating system 314, one or more media capture modules 316, a file size manager 318, and a communications module 320. The operating system 314 contains the various commands used to control the general operation of the media capture device 102. The media capture modules 316 comprise software and/or firmware that is adapted to, in conjunction with the media capture hardware 302, capture data that can be stored by the media capture device 106 in database 322 and/or transmitted to another device. The file size manager 318 is similar in functionality as the like-named module described above in relation to the user computing device 102. Accordingly, the file size manager 318 is adapted to alert the user as to an inappropriate file size that is to be created and/or transmitted and, if desired, change device settings such that the existing or resulting file size will be more appropriate for transmission. The operation of the file size manager 318 is described in detail below in relation to FIGS. 4-6. The communications module 320 is configured to, in conjunction with the device interface elements 310, send media data to another device, such as the user computing device 102, and, where the media capture device is network-enabled, to a destination device 112 via the network 104.

Various software and/or firmware programs have been described herein. It is to be understood that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Figure 4:
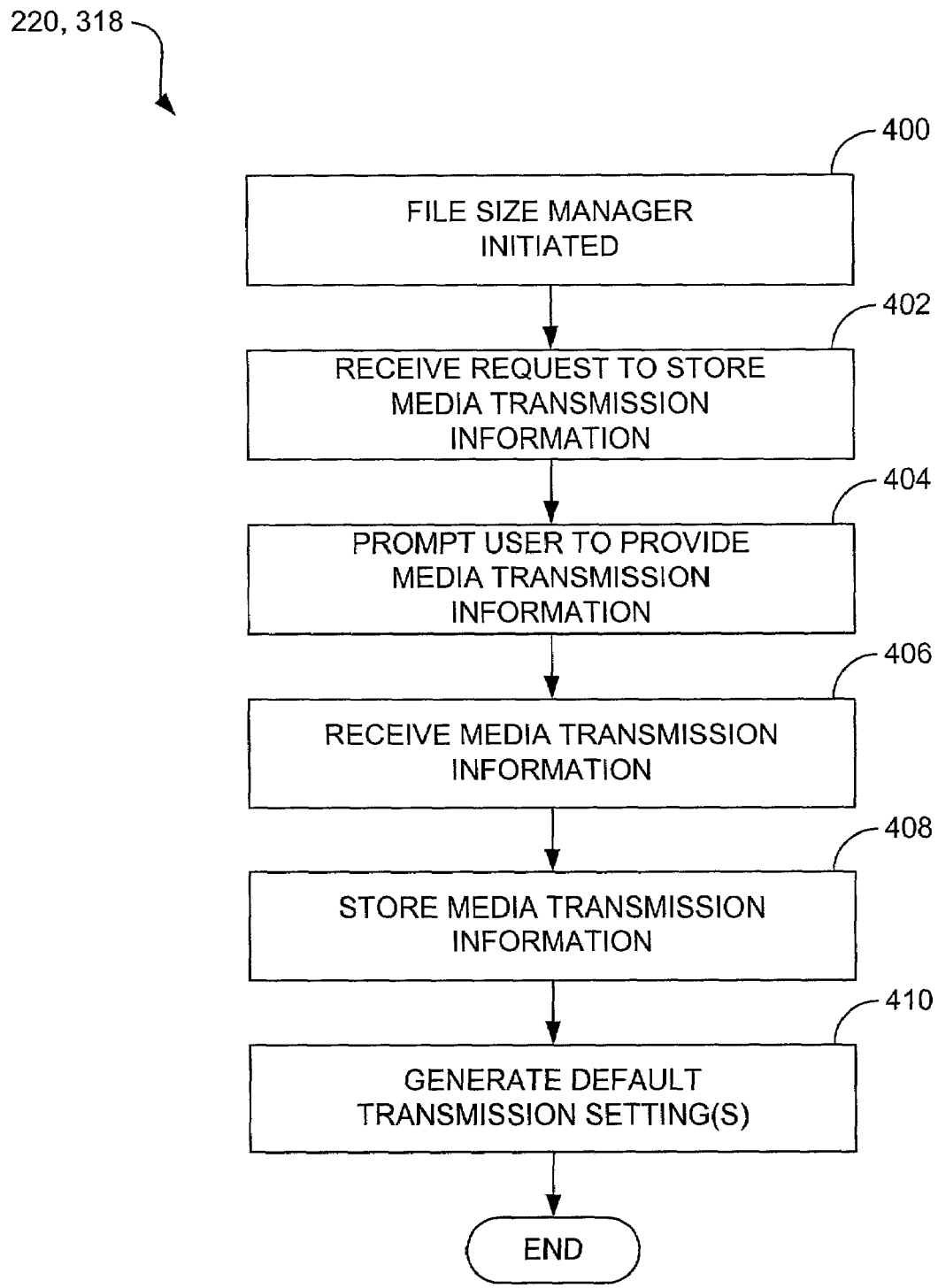
FIG. 4 is a flow diagram that illustrates a first mode of operation of file size managers shown in FIGS. 2 and 3.

As identified above, the file size managers 220, 318 can be used to alert the user as to inappropriate (i.e., overly large) files that will be created and/or transmitted and can further aid the user in reducing the size of files where such aid is desired. Accordingly, the file size managers 220, 318 are generally utilized in two scenarios. In the first scenario, media data that the user intends to transmit is to be captured by the media capture device 106. In the second scenario, previously captured (ie., stored) data is about to be transmitted. In both scenarios, the file size managers 220, 318 can refer to programmed default transmission settings to make a determination as to the appropriateness of current media capture settings and/or the size of an existing file that is about to be transmitted. FIG. 4 illustrates configuration of the file size managers 220, 318 and, more specifically, programming of the default transmission settings.

As indicated in block 400 of FIG. 4, the file size manager 220, 318 is first initiated. This initiation can occur, for instance, in response to an application being opened with the computing device 102 (e.g., a scanning program) or in response to a programming request received by the media capture device 106 (e.g., digital camera 110 or digital video recorder 112). Once the file size manager 220, 318 is initiated, it can receive a request to store media transmission information, as indicated in block 402, and then, as indicated in block 404, prompt the user to provide this information. Generally speaking, the transmission information comprises information that the file manager 220, 318 can use to create the default transmission settings that later will be applied by the file size manager.

By way of example, the transmission information can merely comprise a maximum file size setting that the file size manager 220, 318 can use to determine whether a file that will be transmitted is overly large. In that, as noted above, users often do not appreciate the effect file size has on transmission, the transmission information preferably comprises other information that the file size manager 220, 318 can use to generate the default transmission settings. For instance, where the user is familiar with the concept of resolution and its effect on transmission, the transmission information can comprise a maximum resolution that an image to be transmitted is to possess.

In another example, the transmission information can comprise an indication of the speed with which the media file will be transmitted. The user can therefore provide an indication of the speed of a transmitting device (e.g., modem) that will be used to transmit the media file and/or the speed of the user's network connection, where applicable. Where the user does not possess this information, the file size manager 220, 318 can be configured to automatically obtain the information. By way of example, the file size manager 220, 318 can obtain this information by querying the transmitting device to determine its speed, or by sending a test transmission to another device connected to the network 104 to estimate the speed with which the media file will be transmitted.

In yet a further example, the transmission information can comprise an identification of a maximum transmission time that the user considers acceptable for transmission of his or her media files. In order to satisfy the specified transmission time requirement, the file size manager 220, 318 will again require information as to speed with which the file will be transmitted. This information can be obtained from the user directly or can be automatically determined by the file size manager 220, 318 in the manner described above.

Although the transmission information can be global in nature, i.e. pertinent to all transmissions to all recipients, the transmission information can, alternatively, be particular to the recipient. For instance, where a recipient (e.g., email recipient) has a high speed connection to the network 104, the user may wish to send higher quality images, video, or audio, and therefore larger media files, to that recipient. Accordingly, the file size manager 220, 318 can be configured to store default transmission settings on a recipient-by-recipient basis such that the file size manager 220, 318 will later recognize the intended recipient of the media file and apply different settings to different recipients. These default transmission settings can be generated in similar manner to that described above. Accordingly, the user can identify maximum file sizes, maximum resolutions, data transmission rates, maximum transmission times, etc. as to particular recipients, if desired.

Irrespective of the particular nature of the transmission information, the transmission information is received by the file size manager 220, 318, as indicated in block 406, and stored, as indicated in block 408. At this point, the default transmission settings are generated, for instance according to an algorithm configured to optimize media (e.g., image) quality while still complying with the user's transmission requirements, as indicated in block 410. Accordingly, the default transmission settings can comprise media capture device settings that will result in a particular file size where media is to be captured and then transmitted, or a file size where stored media is to be transmitted. Each of these scenarios is discussed below with respect to FIGS. 5 and 6, respectively. Flow for the configuration of the file size manager 220, 318 is then terminated.

Figure 5:
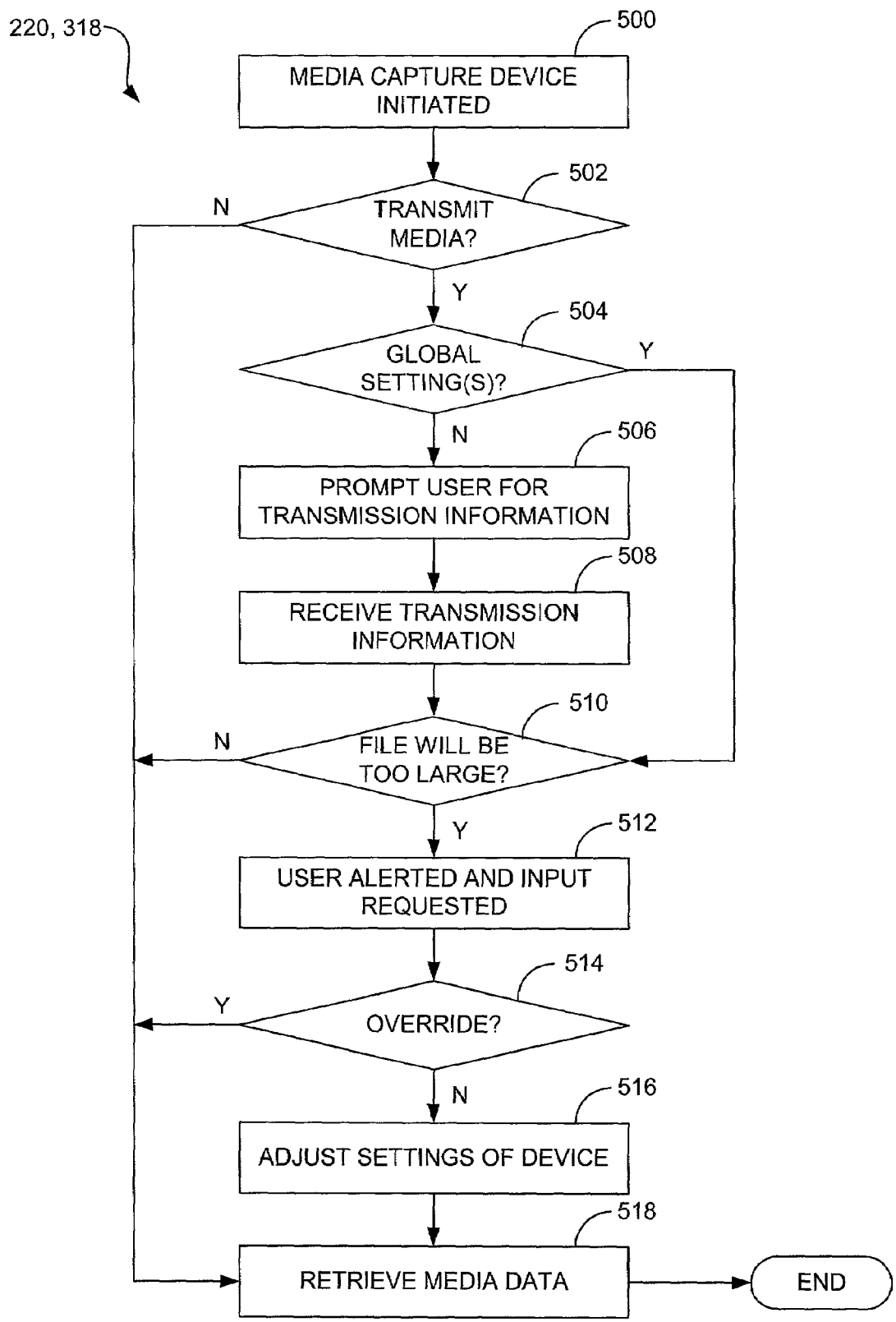
FIG. 5 is a flow diagram that illustrates a second mode of operation of the file size managers shown in FIGS. 2 and 3.

With reference to FIG. 5, illustrated is an example of operation of the file size manager 220, 318 in a media capture scenario. In this scenario, media capture can be accomplished with substantially any media capture device 106. Accordingly, by way of example, the media capture can comprise the scanning of an image with the scanner 108, the creation of a digital photograph with the digital camera 110, or the creation of digital video with the digital video recorder 112. In any case, the media capture device 106 is first initiated, as indicated in block 500. By way of example, this initiation can comprise the initiation of a scanning program running on the user computing device 102 and preview scanning of an image on the device platen. Once the media capture device 106 is initiated, it can be determined whether a media file is going to be transmitted once the capture process has been completed, as indicated in decision element 502. By way of example, this determination can be made with reference to a current device setting or by querying the user. If the media is not to be transmitted, the file size manager 220, 318 is not implicated and the media data can be retrieved, as indicated in block 518. If, on the other hand, the media is to be transmitted, it can be determined whether the user has selected global default transmission settings in which all transmissions will be managed using the same criteria (e.g., maximum transmission time), as indicated in decision element 504. If so, flow continues to decision element 510 described below.

If global default transmission settings are not used, however, flow can continue to block 506 at which the file size manager 220, 318 can prompt the user provide information as to the transmission that will be effected. This information will be cross-referenced with the information previously provided by the user in the file size manager configuration process described above with reference to FIG. 4 or preprogrammed into the device 106. Accordingly, this information can comprise the particular connection the user will be using to transmit the media file (e.g., high speed versus slow speed), the intended recipient of the media file, etc. This information can be communicated by the user with the user interface devices 204, 306. Once this information is provided by the user, it is received by the file size manager 220, 318, as indicated in block 508.

At this point, the file size manager 220, 318 can determine whether the media file that will result from the media capture process, using current device settings, will have a size that is too large in view of user selections made during the configuration process or preprogrammed into the device 106 by referencing the default transmission settings, as indicated in decision element 510. If the file will not be too large, flow continues to block 518 at which the media data is retrieved with the media capture device 106. If the file would be too large, however, flow continues to block 512 at which the user is alerted as to this fact and requested to input instructions as to how to proceed. By way of example, the user can be provided the option of overriding the default transmission settings and capturing the media with current media capture device settings, or permitting the file size manager 220, 318 to automatically adjust the settings of the media capture device such that the default transmission settings will be satisfied. Accordingly, it can be determined whether the user wishes to override the default transmission settings, as indicated in decision element 514. If so, flow again continues to block 518 and the media data is retrieved. If not, however, flow continues to block 516 at which the file size manager 220, 318 adjusts the settings of the media capture device 106 to reduce the size of the media file that will be created.

As is known in the art, the size of the media file to be created by the media capture device 106 can be controlled in several different ways. For example, the resolution with which an image or video will be captured can be reduced to likewise reduce the amount of data that is obtained and, thereby, the size of the media file that will be created. In addition, the number of colors used to create the image or video can be reduced to similarly reduce the file size. Furthermore, the data compression rate can be increased. In any case, however, the file size manager 220, 318 makes the applicable adjustments to the media capture device settings to ensure the default transmission setting requirements are satisfied. As mentioned above, the settings are normally chosen to maximize media quality without violating the default transmission settings.

Once the necessary adjustments have been made, flow for the file size manager 220, 318 is terminated and the desired transmission can occur. This transmission can be facilitated with any one of a number of destination applications that are stored on the computing device 102 or the media capture device 106. For instance, where the media capture device 106 comprises a scanner, the media file can be transmitted to an email recipient with the mail application 218 shown in FIG. 2. Alternatively, where the media capture device 106 is network-enabled, the transmission can be facilitated by the communications module 320.

Figure 6:
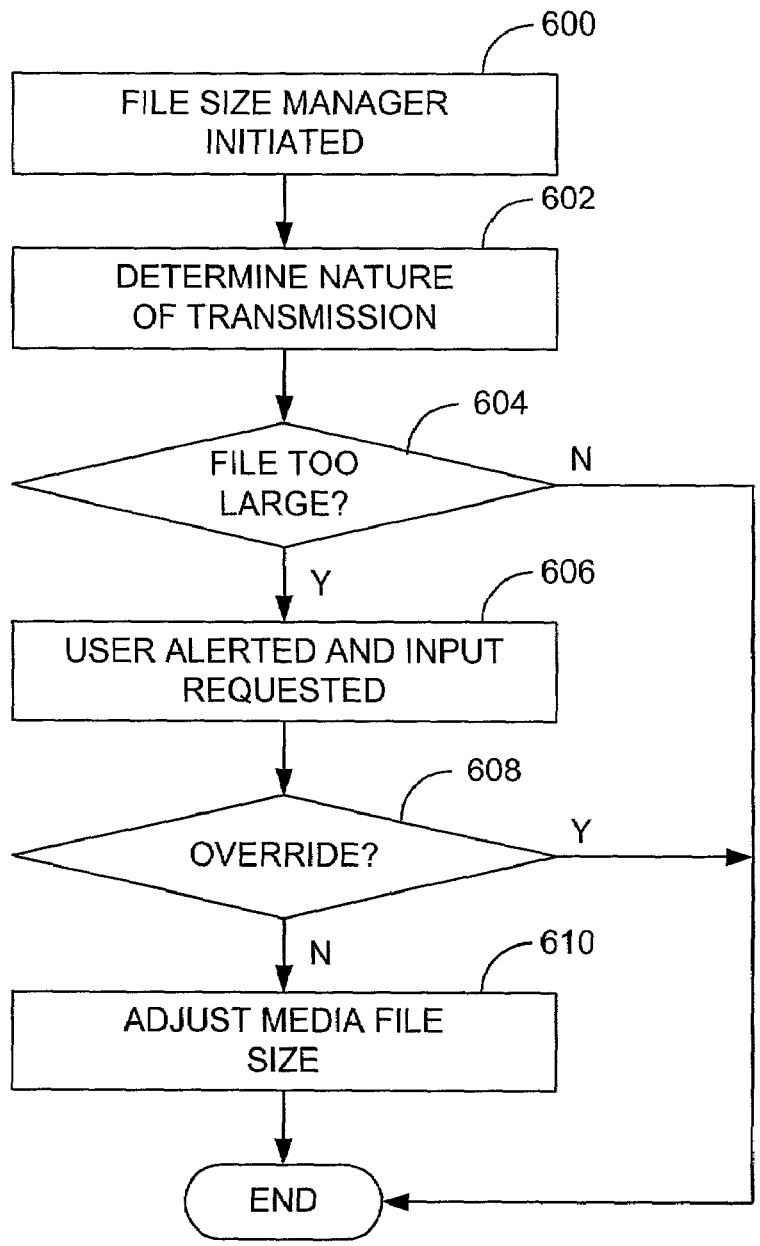
FIG. 6 is a flow diagram that illustrates a third mode of operation of the file size managers shown in FIGS. 2 and 3.

Referring now to FIG. 6, an example of operation of the file size manager 220, 318 in the stored file transmission scenario is provided. In this scenario, it is assumed that an media file to be transmitted has already been created and is stored in the database 222 of the computing device 102 or database 322 of the media capture device 106. By way of example, transmission can comprise the emailing of a media file to an email recipient (e.g., computing device 116) or the uploading of the media file to a network server (e.g. server 118) for posting or archival.

In this scenario, the user can manipulate an appropriate application (e.g., mail application 218) to facilitate the transmission. Once the user initiates the transmission (e.g. by selecting a "send" or an "upload" button), or in response to another predetermined trigger, the file size manager 220, 318 is initiated, as indicated in block 600. Normally, the file size manager 220, 318 is configured such that it is called upon whenever a media file is to be transmitted by the user computing device 102 or media capture device 106. Accordingly, the file size manager 220, 318 can be integrated with other device applications such that the size of all media files to be transmitted can be controlled. Once the file size manager 220, 318 is initiated, the nature of the transmission can be determined, as indicated in block 602. In this second scenario, however, the user need not be prompted for this information in that it presumably already has been entered. Therefore, the file size manager 220, 318 can obtain this information from the application being used to send the media file. After the nature of the transmission has been determined, the file size manager 220, 318 can determine whether the size of the media file is too large with reference to the applicable default transmission settings (i.e., default file size), as indicated in decision element 604.

If the media file is not too large, flow is terminated for the file size manager 220, 318 and the media file may be transmitted. If, on the other hand, the media file is too large, flow continues to block 606 at which the user can be alerted to this fact and is requested to provide instructions as to how to proceed. Again, the user can be provided the option of overriding the default transmission settings and transmitting the media file as is, or permitting the file size manager 220, 318 to adjust the size of the file before transmitting it. Therefore, it can be determined whether the user wishes to override the default transmission settings, as indicated in decision element 608. If so, flow for the file size manager 220 is again terminated. If the user does not wish to override the default transmission settings, however, flow continues to block 610 at which the size of the file is adjusted and, more particularly, reduced. Although, in the description provided above in relation to FIGS. 5 and 6, the user is alerted as to an overly large file size, the manager 220, 318 can be configured to skip this step and automatically proceed to adjusting settings and/or file size.

As is known in the art, the size of the media file can be reduced in several different ways. For example, an image or video segment can be downsampled to remove a substantial portion of the media data, thereby reducing the file size. In addition or alternatively, the compression ratio of the file can be increased, for instance using a lossy compression protocol such as JPEG or MPEG. Furthermore, the file size manager 220 can reduce the bit depth of the image or video to reduce the number of colors used to form the media and, therefore, the file size. In any case, the file size manager 220, 318 uses file size reduction methods to reduce the size of the file to be transmitted to a level that complies with the default transmission settings. Once this size reduction has occurred, the flow for the file size manager 220, 318 is terminated and the media file can be transmitted as desired by the user.

What is claimed is:

1. A computer-implemented method for managing file size for media to be captured by a media capture device and transmitted to a destination, the method comprising:
   referring to a default transmission setting to determine whether a media file to be created will be too large; and
   adjusting media capture device settings before any media are captured to reduce the size of the media file that will be created where the file would be too large.

2. The method of claim 1, further comprising generating the default transmission setting.

3. The method of claim 2, wherein the default transmission setting is generated in relation to a maximum file size setting.

4. The method of claim 2, wherein the default transmission setting is generated in relation to a maximum resolution setting.

5. The method of claim 2, wherein the default transmission setting is generated in relation to a transmission speed.

6. The method of claim 5, further comprising determining the transmission speed by querying a transmitting device to determine its speed.

7. The method of claim 5, further comprising determining the transmission speed by sending a test transmission to estimate the speed at which the file will be transmitted.

8. The method of claim 2, wherein the default transmission setting is generated in relation to a maximum transmission time.

9. The method of claim 2, wherein the default transmission setting is different for different transmission destinations.

10. The method of claim 1, further comprising alerting a user if the media file would be too large.

11. A computer-implemented system for managing file size for media to be captured by a media capture device and transmitted to a destination, the system comprising:
    means for referring to a default transmission setting to determine whether a media file to be created will be too large; and
    means for adjusting media capture device settings before any media are captured to reduce the size of the media file that will be created.

12. The system of claim 11, further comprising means for generating the default setting.

13. The system of claim 11, further comprising means for alerting a user if the media file will exceed the predetermined size.

* * * * *